(12) United States Patent
Hu

(10) Patent No.: US 9,612,771 B2
(45) Date of Patent: Apr. 4, 2017

(54) METHOD AND SYSTEM FOR PROCESSING HOT TOPIC MESSAGE

(71) Applicant: Mingren Hu, Shenzhen (CN)

(72) Inventor: Mingren Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/706,804

(22) Filed: May 7, 2015

(65) Prior Publication Data

US 2015/0254021 A1  Sep. 10, 2015

Related U.S. Application Data

(63) Continuation of application No. PCT/CN2013/086129, filed on Oct. 29, 2013.

(30) Foreign Application Priority Data

Nov. 8, 2012 (CN) .......................... 2012 1 0442720

(51) Int. Cl.
*G06F 3/00* (2006.01)
*G06F 3/06* (2006.01)
(Continued)

(52) U.S. Cl.
CPC ............ *G06F 3/0656* (2013.01); *G06F 3/061* (2013.01); *G06F 3/0673* (2013.01);
(Continued)

(58) Field of Classification Search
CPC ...... G06F 3/0656; G06F 17/30; G06F 3/0673; G06F 13/102; G06F 3/061; H04L 51/22
See application file for complete search history.

(56) References Cited

U.S. PATENT DOCUMENTS 6,026,027 A * 2/2000 Terrell, II ........... G06F 12/0246
                                                    365/185.33
6,845,390 B1 * 1/2005 Jorgenson ............... H04L 67/02
                                                    709/205
(Continued)

FOREIGN PATENT DOCUMENTS

CN        1997015          7/2007
CN        1997015 A    *  7/2007
(Continued)

OTHER PUBLICATIONS

"We Media" by Shayne Bowman and Chris Willis, Jul. 2003, http://www.hypergene.net/wemedia/.*

(Continued)

*Primary Examiner* — Jing-Yih Shyu
(74) *Attorney, Agent, or Firm* — Blakely Sokoloff Taylor & Zafman LLP

(57) ABSTRACT

Embodiments of the present invention provide a method and system for processing hot topic message. The method includes: receiving, by an interface machine, a read request for a message, and determining whether the interface machine has buffered the message and whether buffering duration of the message does not exceed preset valid duration; feeding back, if the message has been buffered and the buffering duration of the message does not exceed the preset valid duration, the message that the interface machine has buffered; and determining, if the message has been buffered but the buffering duration of the message exceeds the preset valid duration or the message is not buffered, whether the message is a hot topic message, and retrieving, if the message is a hot topic message, the hot topic message from a storage machine, buffering the hot topic message, recording a buffering moment, and feeding back the hot topic message.

6 Claims, 5 Drawing Sheets

(51) Int. Cl.
  *H04L 12/58* (2006.01)
  *G06F 13/10* (2006.01)
  *G06F 17/30* (2006.01)
(52) U.S. Cl.
  CPC ............ *G06F 13/102* (2013.01); *G06F 17/30* (2013.01); *H04L 51/22* (2013.01)

(56) References Cited

U.S. PATENT DOCUMENTS

| | | | | |
|---|---|---|---|---|
| 9,319,363 | B1* | 4/2016 | Walkin | H04L 51/14 |
| 2003/0033333 | A1* | 2/2003 | Nishino | G06F 17/30884 |
| | | | | 715/255 |
| 2006/0033743 | A1* | 2/2006 | Morein | G06T 15/005 |
| | | | | 345/501 |
| 2006/0097043 | A1* | 5/2006 | Johnson | G06Q 20/20 |
| | | | | 235/383 |
| 2007/0094247 | A1* | 4/2007 | Chowdhury | G06F 17/30864 |
| 2007/0143442 | A1* | 6/2007 | Zhang | G06Q 10/107 |
| | | | | 709/217 |
| 2007/0174233 | A1* | 7/2007 | Ginis | H04L 41/50 |
| 2008/0153460 | A1* | 6/2008 | Chan | H04W 4/12 |
| | | | | 455/412.1 |
| 2008/0165287 | A1* | 7/2008 | Doswald | H04N 5/44 |
| | | | | 348/718 |
| 2009/0300322 | A1* | 12/2009 | Mercer | H04L 63/10 |
| | | | | 711/219 |
| 2013/0144869 | A1* | 6/2013 | Shalabi | G06F 17/211 |
| | | | | 707/722 |
| 2013/0177308 | A1* | 7/2013 | Rope | H04B 10/0799 |
| | | | | 398/25 |

FOREIGN PATENT DOCUMENTS

| | | | |
|---|---|---|---|
| CN | 101169790 | | 4/2008 |
| CN | 101169790 A | * | 4/2008 |
| CN | 101232464 | | 7/2008 |
| CN | 102244900 | | 11/2011 |
| CN | 103577501 A | * | 2/2014 |

OTHER PUBLICATIONS

International Search Report for International Application No. PCT/CN2013/086129, mailed Jan. 23, 2014.

* cited by examiner

METHOD AND SYSTEM FOR PROCESSING HOT TOPIC MESSAGE

This application is a continuation of International Application No. PCT/CN2013/086129, filed on Oct. 29, 2013, which claims priority to Chinese patent application No. 201210442720.4, filed on Nov. 8, 2012, the content of which are incorporated herein by reference in their entirety.

FIELD OF THE TECHNOLOGY

The present disclosure relates to the field of computer technologies and Internet technologies, and in particular, to a method and system for processing a hot topic message.

BACKGROUND OF THE DISCLOSURE

A User Generated Content (UGC) technology has found wider application ever since the appearance. For example, a microblog is a widely applied UGC application.

As a We Media technology, a UGC application has a news function similar to traditional media, and at the same time can also provide a hot topic message. If a message, after being generated, has been forwarded many times within a very short period of time, the message is called a hot topic message. A hot topic message spreads rapidly, and a large number of requests for the hot topic message that are generated instantly pose a heavy load on a storage system of the hot topic message. In order to lighten the load on the storage system, at present, a generally used method is to build multiple data backups at a bottom layer of the storage system, so as to achieve an effect of distributing the requests. The disadvantages of the manner are as follows:

(1) Increase in cost: One more data backup certainly requires extra machine expense, which causes an increase in cost.

(2) There cannot be too many backup points, or otherwise the price of data synchronization between a main point and multiple backup points is too high.

(3) Supported request quantity is limited: A maximum request quantity that a system can support is a sum of those of several backup points. If the maximum request quantity that the system can support is exceeded, the system may break down.

SUMMARY

Embodiments of the present invention provide a method for processing a hot topic message, which can lighten a load on a storage system caused by a massive quantity of requests for a hot topic message.

The method for processing a hot topic message includes:

receiving, by an interface machine, a read request for a message, and determining whether the interface machine has buffered the message and whether buffering duration of the message does not exceed preset valid duration; feeding back, if the message has been buffered and the buffering duration of the message does not exceed the preset valid duration, the message that the interface machine has buffered; and determining, if the message has been buffered but the buffering duration of the message exceeds the preset valid duration or the message is not buffered, whether the message is a hot topic message, and retrieving, if the message is a hot topic message, the hot topic message from a storage machine, buffering the hot topic message, recording a buffering moment, and feeding back the hot topic message.

An embodiment of the present invention further provides a system for processing a hot topic message, which can lighten a load on a storage system caused by a massive quantity of requests for a hot topic message.

The system for processing a hot topic message includes a storage machine and more than one interface machine, the interface machine including:

a hot topic buffering module, configured to buffer a hot topic message;

a processing module, configured to: receive a read request for a message, and determine whether the hot topic buffering module has buffered the message and whether buffering duration of the message does not exceed preset valid duration; feed back, if the hot topic buffering module has buffered the message and the buffering duration of the message does not exceed the preset valid duration, the message buffered by the hot topic buffering module; and determine, if the hot topic buffering module has buffered the message but the buffering duration of the message exceeds the preset valid duration or the hot topic buffering module has not buffered the message, whether the message is a hot topic message, and retrieve, if the message is a hot topic message, the hot topic message from the storage machine, send the hot topic message to the hot topic buffering module for buffering, record a buffering moment, and feed back the hot topic message.

It can be seen that, for the method and system for processing a hot topic message provided in the embodiments of the present invention, a large number of interface machines that exist in a system are used to store a hot topic message, so that it is implemented that interface machines are used to share hot topic requests, and a load on a storage machine caused by hot topic requests is lightened.

DESCRIPTION OF EMBODIMENTS

Embodiments of the present invention provide a method and system for processing a hot topic message. The system for processing a hot topic message includes a storage machine and multiple interface machines. A hot topic message is buffered in each interface machine. In this way, hot topic requests that are gathered in one storage machine may be shared by the multiple interface machines, thereby significantly lowering a frequency of accessing the storage machine and lightening a load on the storage machine. Moreover, a hot topic message buffered in each interface machine becomes invalid after a period of time, so as to achieve consistency between data stored in the storage machine and data buffered in the interface machines.

Figure 1:
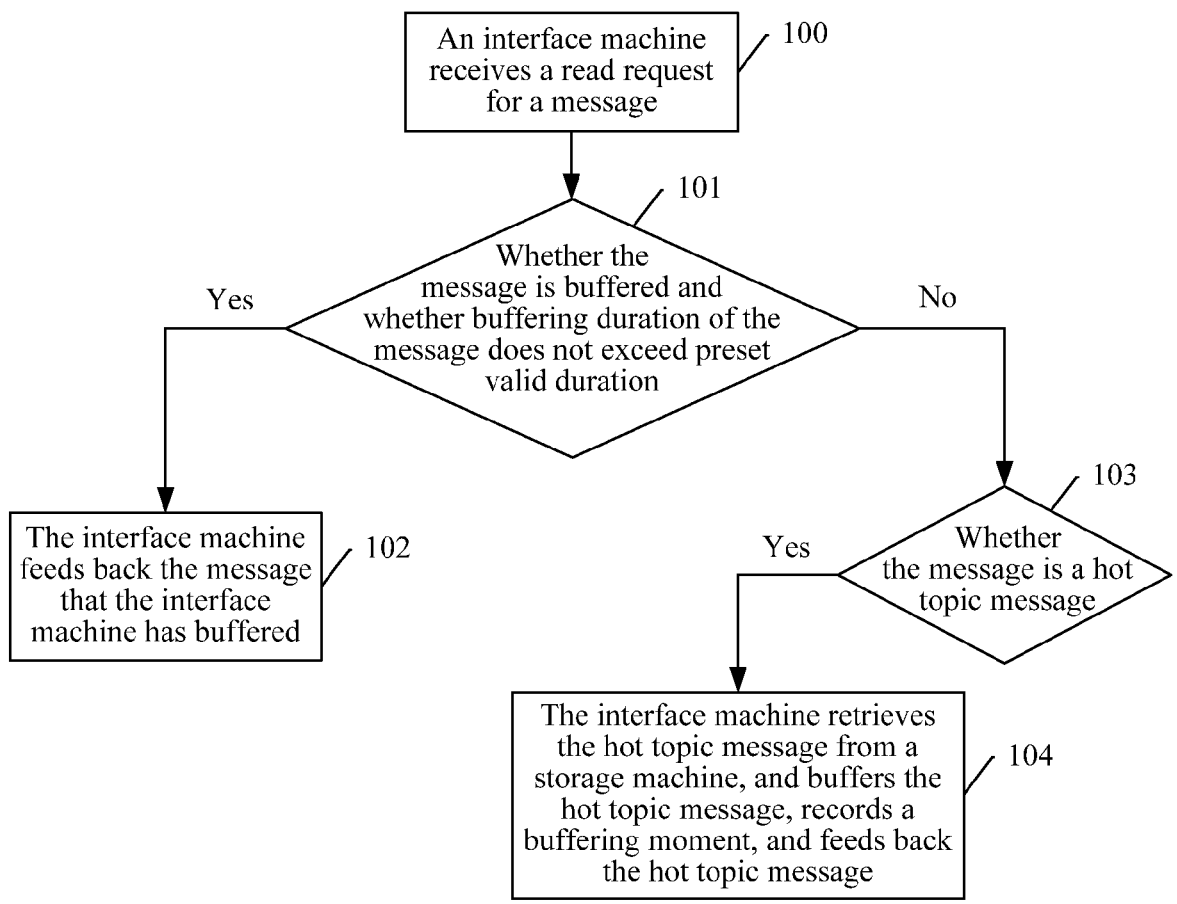
FIG. 1 is a flowchart of a method for processing a hot topic message according to an embodiment of the present invention.

FIG. 1 is a flowchart of a method for processing a hot topic message according to an embodiment of the present invention, including:

Step 100: An interface machine receives a read request for a message.

Step 101: The interface machine determines whether the interface machine has buffered the message and whether buffering duration of the message does not exceed preset valid duration; performs, if the message has been buffered and the buffering duration of the message does not exceed the preset valid duration, step 102; and performs, if the message has been buffered but the buffering duration of the message exceeds the preset valid duration or the message is not buffered, step 103.

Step 102: The interface machine feeds back the message that the interface machine has buffered.

Step 103: The interface machine determines whether the message is a hot topic message, and performs, if yes, step 104.

Step 104: The interface machine retrieves the hot topic message from a storage machine, buffers the hot topic message, records a buffering moment, and feeds back the hot topic message.

In step 101 above, the buffering duration of the message is a time interval between a moment when the interface machine receives the read request for the message and a buffering moment of the message.

Figure 2:
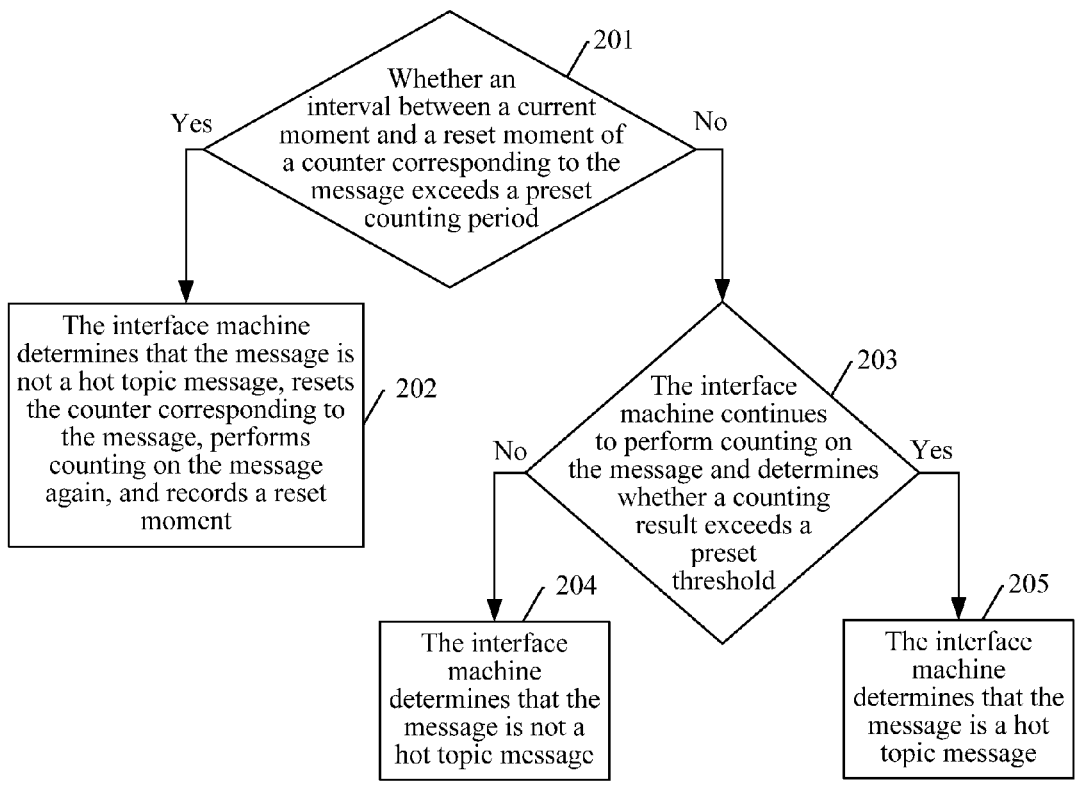
FIG. 2 is a flowchart of a method for determining whether a message is a hot topic message according to an embodiment of the present invention.

FIG. 2 is a flowchart of a method for determining whether a message is a hot topic message in step 103 above. The method includes:

Step 201: The interface machine determines whether an interval between a current moment and a reset moment of a counter corresponding to the message exceeds a preset counting period, and performs, if the interval exceeds the preset counting period, step 202, or performs, if the interval does not exceed the preset counting period, step 203.

Step 202: The interface machine determines that the message is not a hot topic message, resets the counter corresponding to the message, performs counting on the message again, and records a reset moment.

Step 203: The interface machine continues to perform counting on the message and determines whether a counting result exceeds a preset threshold, and performs, if the counting result does not exceed the preset threshold, step 204, or performs, if the counting result exceeds the preset threshold, step 205.

Step 204: The interface machine determines that the message is not a hot topic message.

Step 205: The interface machine determines that the message is a hot topic message.

It should be noted that when the interface machine receives a first read request for a message, because the message is not counted before, the interface machine sets a counter corresponding to the message first and records a setting moment as a reset moment of the counter.

In step 104 above, a manner in which the interface machine retrieves the hot topic message from the storage machine is: sending, by the interface machine to the storage machine, a retrieval command including a hot topic flag bit, and receiving a response message fed back by the storage machine, where the response message includes the hot topic flag bit and a hot topic message to be retrieved by the interface machine; and identifying, by the interface machine according to the hot topic flag bit in the response message, the hot topic message, and retrieving the hot topic message.

In step 104 above, when the interface machine retrieves the hot topic message from the storage machine, if the interface machine has buffered an old version of the hot topic message, the interface machine replaces the old version of the hot topic message when buffering the retrieved hot topic message.

According to the embodiment of the present invention, a process of determining a hot topic message is described as follows.

Figure 3:
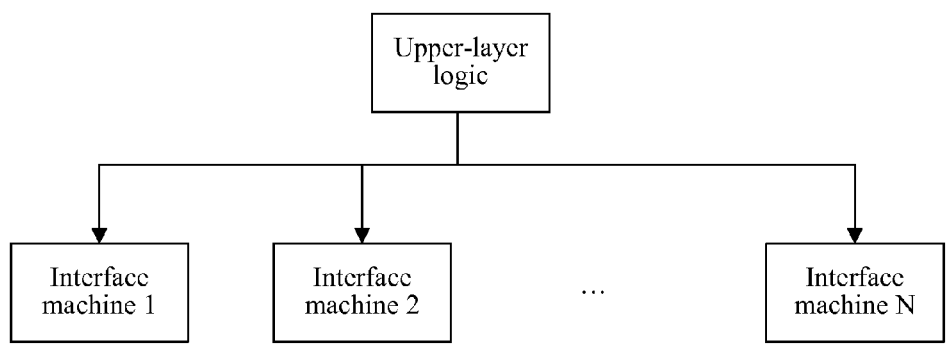
FIG. 3 is a schematic diagram of distribution of multiple interface machines according to an embodiment of the present invention.

FIG. 3 is a schematic diagram of distribution of multiple interface machines according to an embodiment of the present invention. Multiple interface machines are distributed in the system for processing a hot topic message. Each interface machine can be accessed by upper-layer logic and can retrieve a message from a storage machine. The upper-layer logic accesses each interface machine and requests to read a message. After receiving a read request for a message from the upper-layer logic, the interface machine first determines a storage location of the message and then reads the message from the storage position and feeds back the message to the upper-layer logic.

In this embodiment, each interface machine identifies a hot topic message. In an example, the upper-layer logic accesses each interface machine evenly. In this way, a possibility that each interface machine receives an access request for a hot topic message is even. Certainly, even if the upper-layer logic does not access each interface machine completely evenly and a backup of the hot topic message only exists in some of interface machines, a load on a storage system can also be lightened.

A counter may be used in each interface machine to count the number of requests for a message within a counting period. Once the number of requests exceeds a preset threshold, the message is determined as a hot topic message. For example, the preset counting period may be 2 or 3 seconds. When a read request for a message is received, if an interval between a current moment and a moment when the counter is reset exceeds a preset counting period, the counter is reset and counting is performed again on the message, and a reset moment is recorded.

According to the embodiment of the present invention, a process of reading and buffering a hot topic message is described as follows.

Figure 4:
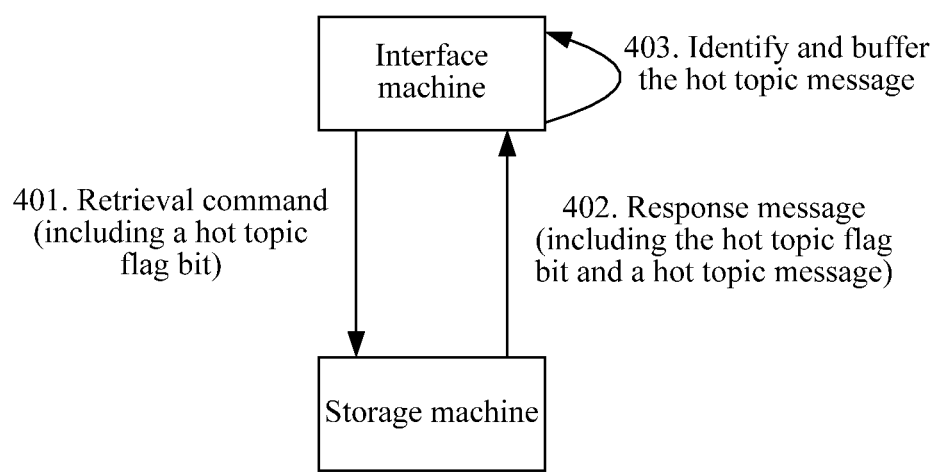
FIG. 4 is a schematic diagram of a procedure of interaction between an interface machine and a storage machine according to an embodiment of the present invention.

FIG. 4 is a schematic diagram of a procedure of interaction between an interface machine and a storage machine according to an embodiment of the present invention. The process includes:

Step 401: After determining that a message is a hot topic message, an interface machine sends a retrieval command for the hot topic message to the storage machine, where the retrieval command includes a hot topic flag bit.

Step 402: The storage machine feeds back a response message to the interface machine, where the response message includes the hot topic flag bit and all data of the hot topic message.

Step 403: The interface machine identifies the hot topic message according to the hot topic flag bit in the response message, retrieves and buffers the hot topic message, and records a buffering moment of the hot topic message.

At the same time, the interface machine further retrieves a common message from the storage machine. For the common message, neither the retrieval command sent by the interface machine nor the response message fed back by the storage machine includes the hot topic flag bit, and the interface machine also has not buffered the common message.

According to the embodiment of the present invention, invalidation of a hot topic message is described as follows.

In the embodiment of the present invention, whether a message is a hot topic message is determined according to the number of read requests for the message, but deletion and update requests for the message do not occur within a short period of time. In a UGC system, compared with read requests for a message, there are very few deletion and update requests for the message. Moreover, one deletion or update request is passed to a bottom layer only through one interface machine. After the message is deleted or updated at the bottom layer, another interface machine that has buffered the message does not know that the message has been deleted or updated at the bottom layer and therefore, also does not delete or update the message that the another interface machine has buffered. In this way, a problem of inconsistency between a message buffered in an interface machine and a message stored at a bottom layer occurs. Therefore, it is necessary to consider invalidation of a hot topic message in an interface machine, which is also a reason why a buffering moment of a hot topic message needs to be marked in this embodiment.

If a time interval has elapsed after a hot topic message is read from a storage machine by an interface machine, the hot topic message becomes invalid and the interface machine needs to read a hot topic message again from the storage machine to ensure that the hot topic message stored in the storage machine is consistent with the hot topic message buffered in the interface machine. The time interval cannot be set too long, and may be set to about 3 seconds.

A specific implementation manner may be as follows: When receiving a request for a hot topic message, the interface machine calculates buffering duration of the hot topic message according to a current moment and a buffering moment of the hot topic message (the buffering duration is obtained by subtracting the buffering moment from the current moment). If the buffering duration does not exceed preset valid duration, the interface machine determines that the hot topic message is valid and feeds back the hot topic message that the interface machine has buffered. If the buffering duration exceeds the preset valid duration, the interface machine determines again whether the message is a hot topic message. The valid duration of the hot topic message herein is a dynamic value that can be manually adjusted. This value is mainly to ensure that, after a message in a storage machine is modified, the message can be updated in an interface machine very soon, thereby ensuring consistency of the message and meanwhile, further reducing the number of requests for the message in the storage machine. The value may be determined according to experience in an actual application.

When an interface machine retrieves and buffers a hot topic message, if the interface machine has buffered an old version of the hot topic message, the interface machine may replace the old version of the hot topic message when buffering the hot topic message.

According to the embodiment of the present invention, a procedure of processing, by an interface machine, a read request for a message is described as follows.

Figure 5:
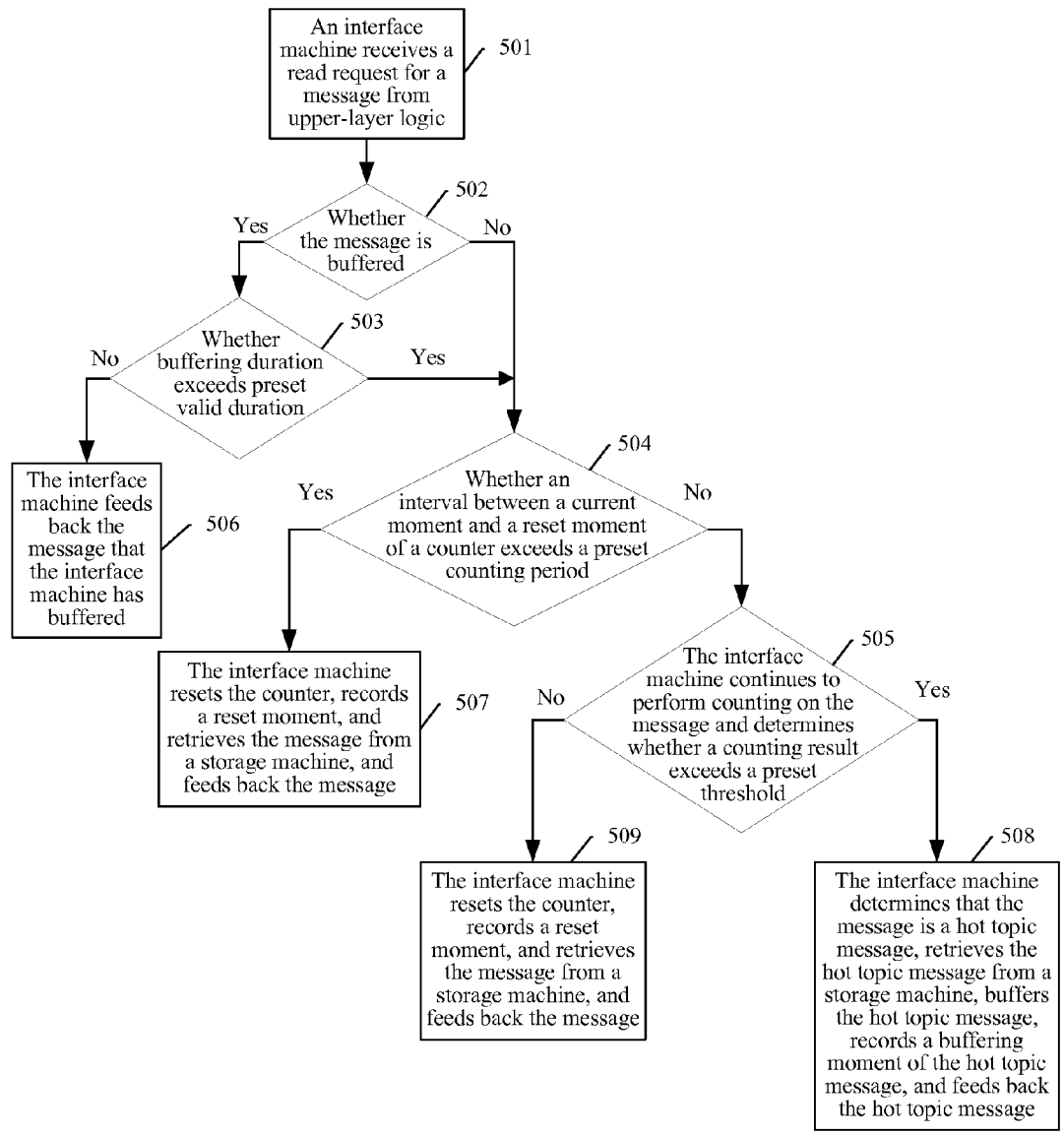
FIG. 5 is a schematic diagram of a procedure of processing, by an interface machine, a read request for a message according to an embodiment of the present invention.

FIG. 5 is a schematic diagram of a procedure of processing, by an interface machine, a read request for a message according to an embodiment of the present invention. The process includes:

Step 501: An interface machine receives a read request for a message from upper-layer logic.

Step 502: The interface machine determines whether the interface machine has buffered the message, and performs, if yes, step 503, or otherwise, performs step 504.

Step 503: The interface machine determines whether buffering duration of the message exceeds preset valid duration, and performs, if the buffering duration does not exceed the valid duration, step 506, or performs, if the buffering duration exceeds the valid duration, step 504.

Step 504: The interface machine determines whether an interval between a current moment and a reset moment of a counter for the message exceeds a preset counting period, and performs, if the interval exceeds the preset counting period, step 507, or performs, if the interval does not exceed the preset counting period, step 505.

Step 505: The interface machine continues to perform counting on the message (that is, adding 1 to a value of the counter) and determines whether a counting result exceeds a preset threshold and performs, if the counting result exceeds the preset threshold, step 508, or performs, if the counting result does not exceed the preset threshold, step 509.

Step 506: The interface machine feeds back the message that the interface machine has buffered.

Step 507: The interface machine resets the counter, records a reset moment, retrieves the message from a storage machine, and feeds back the message.

Step 508: The interface machine determines that the message is a hot topic message, retrieves the hot topic message from a storage machine, buffers the hot topic message, records a buffering moment of the hot topic message, and feeds back the hot topic message.

Step 509: Retrieve the message from a storage machine and feeds back the message.

Figure 6:
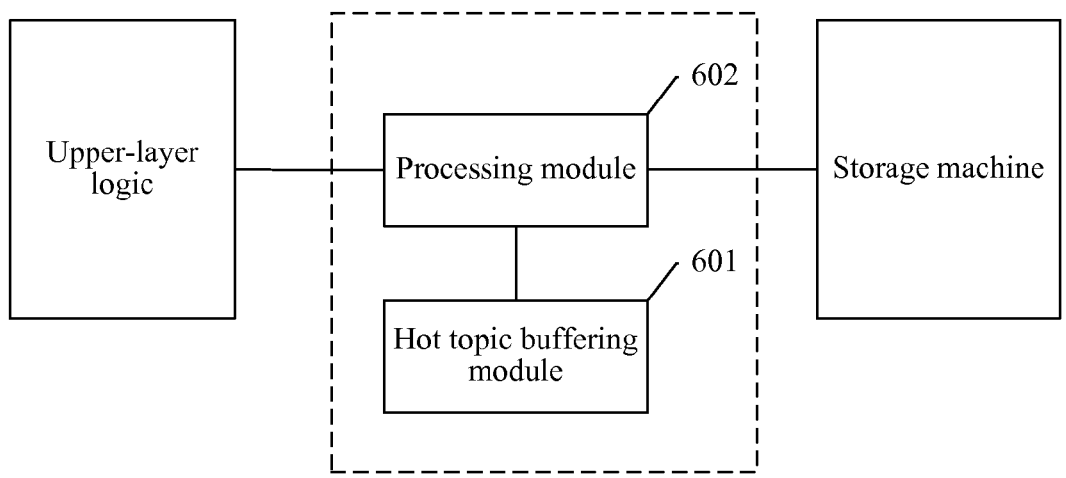
FIG. 6 is a schematic structural diagram of a system for processing a hot topic message according to an embodiment of the present invention.

An embodiment of the present invention further provides a system for processing a hot topic message, including a storage machine and more than one interface machine. FIG. 6 is a schematic structural diagram of a system for processing a hot topic message according to an embodiment of the present invention, where the interface machine includes:

a hot topic buffering module 601, configured to buffer a hot topic message;

a processing module 602, configured to: receive a read request for a message, and determine whether the hot topic buffering module 601 has buffered the message and whether buffering duration of the message does not exceed preset valid duration; feed back, if the hot topic buffering module 601 has buffered the message and the buffering duration of the message does not exceed the preset valid duration, the message buffered by the hot topic buffering module 601; and determine, if the hot topic buffering module 601 has buffered the message but the buffering duration of the message exceeds the preset valid duration or the hot topic buffering module 601 has not buffered the message, whether the message is a hot topic message, and retrieve, if the message is a hot topic message, the hot topic message from the storage machine, send the hot topic message to the hot topic buffering module 601 for buffering, record a buffering moment, and feed back the hot topic message.

A manner in which the foregoing processing module 602 determines whether the message is a hot topic message is:

determining whether an interval between a current moment and a reset moment of a counter corresponding to the message exceeds a preset counting period, and determining, if the interval exceeds the preset counting period, that the message is not a hot topic message, resetting the counter for the message, performing counting again for the message, and recording a reset moment; or continuing, if the interval does not exceed the preset counting period, to perform counting on the message, and determining whether a counting result exceeds a preset threshold, and determining, if the counting result does not exceed the preset threshold, that the message is not a hot topic message, or determining, if the counting result exceeds the preset threshold, that the message is a hot topic message.

A manner in which the foregoing processing module 602 retrieves the hot topic message from a storage machine is:

sending, to the storage machine, a retrieval command including a hot topic flag bit, and receiving a response message fed back by the storage machine, where the response message includes the hot topic flag bit and a hot topic message to be retrieved by the processing module; and identifying, according to the hot topic flag bit in the response message, the hot topic message, and retrieving the hot topic message.

When the foregoing hot topic buffering module 601 receives the hot topic message sent by the processing module 602, if an old version of the hot topic message has been buffered, the hot topic buffering module 601 replaces the old version of the hot topic message when buffering the hot topic message.

The buffering duration of the foregoing message is a time interval between a moment when the processing module 602 receives the read request for the message and the buffering moment of the message.

In conclusion, for the method and system for processing a hot topic message provided in the embodiments of the present invention, a large number of interface machines that exist in a system are used to store a hot topic message, and when an interface machine receives a request for the hot topic message, the interface machine does not need to retrieve the hot topic message from a storage machine, and instead only needs to feed back the hot topic message stored in the storage machine to upper-layer logic, so that it is implemented that interface machines are used to share hot topic requests, and a load on a storage machine caused by hot topic requests is lightened.

The foregoing descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for processing a hot topic message, the method comprising:
    receiving, by an interface machine, a read request for a message, and determining, by the interface machine, whether the interface machine has buffered the message and whether buffering duration of the message does not exceed preset valid duration;
    when the interface machine determines that the message has been buffered and the buffering duration of the message does not exceed the preset valid duration, feeding back, by the interface machine, the message that the interface machine has buffered; and
    when the interface machine determines that the message has been buffered but the buffering duration of the message exceeds the preset valid duration or the message is not buffered, determining, by the interface machine, whether the message is a hot topic message, and when the interface machine determines that the message is a hot topic message, retrieving, by the interface machine, the hot topic message from a storage machine, buffering the hot topic message, recording a buffering moment, and feeding back the hot topic message;
    wherein a manner of the determining whether the message is a hot topic message is:
    determining, by the interface machine, whether an interval between a current moment and a reset moment of a counter corresponding to the message exceeds a preset counting period;
    when the interface machine determines that the interval exceeds the preset counting period, determining, by the interface machine, that the message is not a hot topic message, resetting the counter for the message, performing counting on the message again, and recording a reset moment;
    when the interface machine determines that the interval does not exceed the preset counting period, continuing to perform, by the interface machine, counting on the message, and determining, by the interface machine, whether a counting result exceeds a preset threshold;
    when the interface machine determines that the counting result does not exceed the preset threshold, determining, by the interface machine, that the message is not a hot topic message; and
    when the interface machine determines that the counting result exceeds the preset threshold, determining, by the interface machine, that the message is a hot topic message;
    wherein a manner of the retrieving, by the interface machine, the hot topic message from a storage machine is:
    sending, by the interface machine to the storage machine, a retrieval command comprising a hot topic flag bit, and receiving a response message fed back by the storage machine, the response message comprising the hot topic flag bit and a hot topic message to be retrieved by the interface machine; and identifying, by the interface machine according to the hot topic flag bit in the response message, the hot topic message, and retrieving the hot topic message.

2. The method according to claim 1, further comprising:
    replacing, when the interface machine retrieves the hot topic message from the storage machine, if the interface machine has buffered an old version of the hot topic message, by the interface machine, the old version of the hot topic message when buffering the retrieved hot topic message.

3. The method according to claim 1, wherein the buffering duration of the message is a time interval between a moment when the interface machine receives the read request for the message and the buffering moment of the message.

4. A system for processing a hot topic message, comprising a storage machine and more than one interface machine, the interface machine comprising:
    a hot topic buffering module, configured to buffer a hot topic message; and
    a processing module, configured to: receive a read request for a message, and determine whether the hot topic buffering module has buffered the message and whether buffering duration of the message does not exceed preset valid duration; feed back, if the hot topic buffering module has buffered the message and the buffering duration of the message does not exceed the preset valid duration, the message buffered by the hot topic buffering module; and determine, if the hot topic buffering module has buffered the message but the buffering duration of the message exceeds the preset valid duration or the hot topic buffering module has not buffered the message, whether the message is a hot topic message, and retrieve, if the message is a hot topic message, the hot topic message from the storage machine, send the hot topic message to the hot topic buffering module for buffering, record a buffering moment, and feed back the hot topic message;

wherein the processing module is configured to:

determine whether an interval between a current moment and a reset moment of a counter corresponding to the message exceeds a preset counting period;

if the interval exceeds the preset counting period, determine that the message is not a hot topic message, reset the counter for the message, perform counting on the message again, and record a reset moment;

if the interval does not exceed the preset counting period, continue to perform counting on the message, and determine whether a counting result exceeds a preset threshold;

if the counting result does not exceed the preset threshold, determine that the message is not a hot topic message;

if the counting result exceeds the preset threshold, determine that the message is a hot topic message; and send, to the storage machine, a retrieval command comprising a hot topic flag bit, and receive a response message fed back by the storage machine, the response message comprising the hot topic flag bit and a hot topic message to be retrieved by the processing module; and identify, according to the hot topic flag bit in the response message, the hot topic message, and retrieve the hot topic message.

5. The system according to claim 4, wherein the hot topic buffering module is further configured to: replace, when the hot topic message sent by the processing module is received, if an old version of the hot topic message has been buffered, the old version of the hot topic message when buffering the hot topic message.

6. The system according to claim 4, wherein the buffering duration of the message is a time interval between a moment when the processing module receives the read request for the message and the buffering moment of the message.

\* \* \* \* \*